US011835122B2

(12) United States Patent
Numabe et al.

(10) Patent No.: US 11,835,122 B2
(45) Date of Patent: Dec. 5, 2023

(54) FINAL DRIVE

(71) Applicant: GKN Automotive Limited, Birmingham (GB)

(72) Inventors: Shungo Numabe, Tochigi (JP); Hiromichi Fukuda, Tochigi (JP); Isao Hirota, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/869,056

(22) Filed: Jul. 20, 2022

(65) Prior Publication Data
US 2022/0356938 A1 Nov. 10, 2022

Related U.S. Application Data

(63) Continuation of application No. PCT/JP2020/013049, filed on Mar. 24, 2020.

(51) Int. Cl.
*F16H 57/031* (2012.01)
*F16H 48/08* (2006.01)
(Continued)

(52) U.S. Cl.
CPC .......... *F16H 57/031* (2013.01); *F16H 48/08* (2013.01); *F16H 48/22* (2013.01); *F16H 57/029* (2013.01);
(Continued)

(58) Field of Classification Search
CPC ........ F16H 57/031; F16H 48/08; F16H 48/22; F16H 57/029; F16H 57/037; F16H 2048/087; F16H 48/40; F16H 37/30
See application file for complete search history.

(56) References Cited

U.S. PATENT DOCUMENTS 1,691,230 A * 11/1928 Dennison ................ F16H 48/30
475/250
4,651,587 A 3/1987 Anderson et al.
(Continued)

FOREIGN PATENT DOCUMENTS

CN 86105601 A 11/1987
JP S61-130646 A 6/1986
(Continued)

OTHER PUBLICATIONS

International Search Report and Written Opinion of PCT/JP2020/013049 dated Jun. 9, 2020 (10 pages; with English translation).

*Primary Examiner* — Thomas C Diaz
(74) *Attorney, Agent, or Firm* — Bejin Bieneman PLC

(57) ABSTRACT

A final drive differentially for distributing torque input into a shaft via a differential device to a pair of axles is provided with a ring gear coupled via gearing to the shaft to transmit the torque to the differential device. A housing unitarily includes a main portion supporting the shaft and enclosing the differential device, and a wall portion including a first opening through which one of the axles passes and supporting a first end of the differential device. A cover included a second opening through which the other of the axles passes, and is combined with the housing to support a second end of the differential device, wherein the wall portion, the ring gear, and the shaft are arranged, from the wall portion toward the cover, in an order of the wall portion, the ring gear, and the shaft.

5 Claims, 4 Drawing Sheets

(51) Int. Cl.
*F16H 48/22* (2006.01)
*F16H 57/029* (2012.01)
*F16H 57/037* (2012.01)

(52) U.S. Cl.
CPC ..... *F16H 57/037* (2013.01); *F16H 2048/087* (2013.01)

(56) References Cited

U.S. PATENT DOCUMENTS

| | | | |
|---|---|---|---|
| 6,093,127 A * | 7/2000 | DiDomenico | F16H 48/08 74/424 |
| 6,554,732 B1 * | 4/2003 | Sommer | F16H 48/34 475/221 |
| 7,896,771 B2 * | 3/2011 | Bowers | F16H 48/08 475/237 |
| 2018/0087640 A1 | 3/2018 | Numabe | |

FOREIGN PATENT DOCUMENTS

| | | | | |
|---|---|---|---|---|
| JP | S61-156757 U1 | | 9/1986 | |
| JP | S62-35140 A | | 2/1987 | |
| JP | 06-000881 U1 | | 1/1994 | |
| JP | 08-040103 A | | 2/1996 | |
| JP | 2017-067257 A | | 4/2017 | |
| KR | 20130014044 A | * | 12/2012 | ........... F16H 57/037 |
| WO | 2017/060963 A1 | | 4/2017 | |

\* cited by examiner

FINAL DRIVE

CROSS-REFERENCE TO RELATED APPLICATIONS

This application is a continuation application of PCT International Application No. PCT/JP2020/013049 (filed Mar. 24, 2020), the contents of which are incorporated herein by reference in their entirety.

BACKGROUND

In a vehicle of a rear-wheel driving (FR) type for example, torque generated by an engine and/or a motor is transmitted from a transmission through a propeller shaft to a final drive. The final drive contains a differential gear set built therein, which differentially distributes the transmitted torque to right and left driving wheels.

The final drive may contain a clutch and an actuator for the purpose of limiting differential motion of the differential gear set or cutting torque transmission to the driving wheels. To electrically control the actuator of course requires electric wiring.

Japanese Patent Application Laid-open No. 2017-067257 discloses an example in which an actuator is installed inside a housing and PCT International Publication WO 2017/060963 A1 discloses another example in which an electric device among an actuator is placed outside in order to facilitate wiring.

SUMMARY

The present disclosure describes a final drive of a compact size, particularly in width, and relates to a final drive that is compact yet enables easy wiring to internal electric devices. To design a final drive to be compact provides various benefits, such as greater freedom for vehicle design and reduction in vehicle weight. In return, such a design can make a layout of elements in the housing complex and might be successful only at the expense of ease of assembly. Particularly if internal electric devices are placed far from an opening of the housing, how to establish wiring to these devices and how to verify electric contact at these points could become major problems. Any layouts of a side-cover type are advantageous in compactness but the aforementioned problems become more notable because this type limits the location of the opening to the side face of the housing.

According to an aspect, a final drive differentially distributes torque input into a shaft directed in a first axis via a differential device to a pair of axles directed in a second axis not parallel with the first axis. The final drive is provided with a ring gear coupled via gearing to the shaft to transmit the torque to the differential device about the second axis. A housing unitarily includes a main portion supporting the shaft and enclosing the differential device, and a wall portion including a first opening through which one of the axles passes and supporting a first end of the differential device. A cover includes a second opening through which the other of the axles passes, and can be combined with the housing to support a second end of the differential device, wherein the wall portion, the ring gear, and the shaft are arranged, from the wall portion toward the cover, in an order of the wall portion, the ring gear, and the shaft.

DESCRIPTION OF EMBODIMENTS

Exemplary embodiments will be described hereinafter with reference to the appended drawings. The drawings are not necessarily to scale and therefore it is noted that dimensional relations to each other are not limited to those shown therein.

A final drive according to the present embodiment may be used for driving rear wheels of a four-wheel drive (4WD) vehicle for example but is of course also applicable to a rear-wheel drive (FR) vehicle or any vehicle of any other driving style. The following descriptions are, only for the purpose of illustration, directed to an example of a four-wheel drive vehicle. Commonly in FIGS. 1, 3 and 4, the front F of the vehicle is drawn upward, the right R and the left L respectively rightward and leftward. In FIG. 2 exceptionally, however, the front F is drawn to the lower right. They may be embodied in ways such that the front and the rear, or the right and the left, are arbitrarily exchanged.

Figure 1:
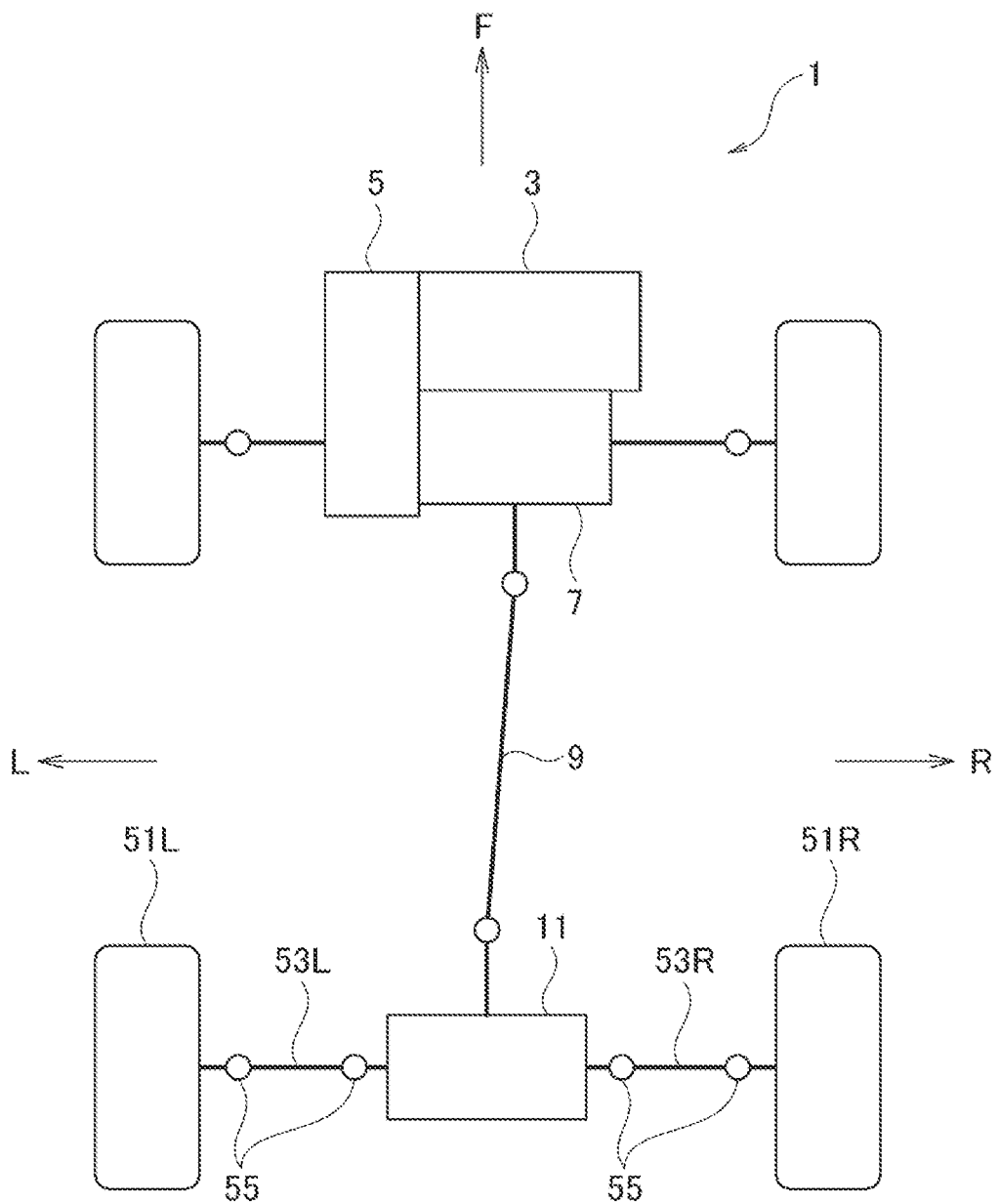
FIG. 1 is a schematic drawing depicting a basic arrangement of a four-wheel drive vehicle.
Figure 2:
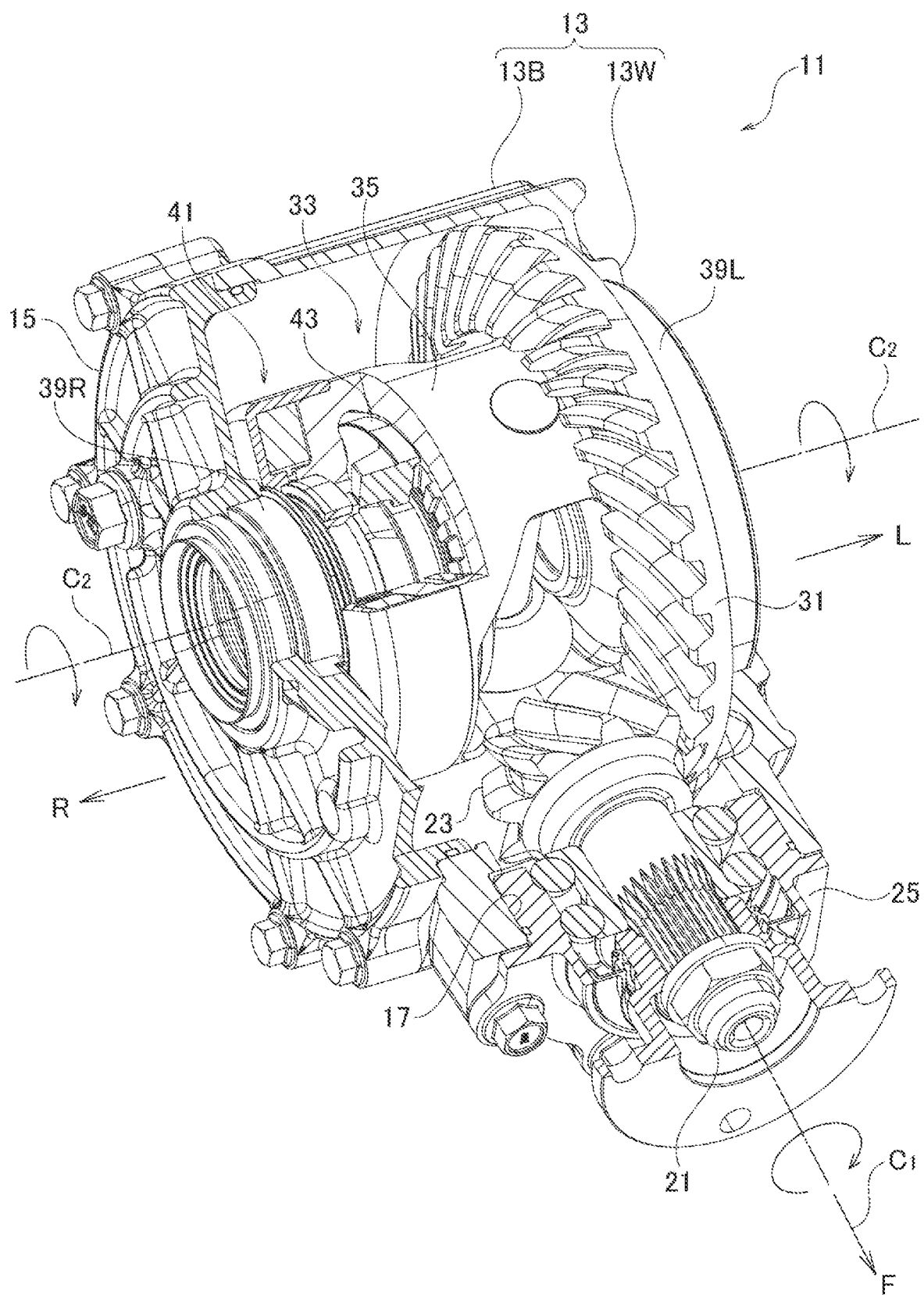
FIG. 2 is a perspective view in which a final drive according to the present embodiment is partly cut-out to show its interior.

Referring to FIG. 1, a four-wheel drive vehicle 1 is generally provided with an engine/motor 3 and a transmission 5. Part of torque generated by the engine/motor 3 is distributed through the transmission 5 to both front wheels, and the other part is taken out via a power transfer unit 7 to a propeller shaft 9 and distributed through a final drive 11 to both rear wheels 51R, 51L.

The rear wheels 51R, 51L are generally capable of floatingly moving relative to the vehicle body to absorb bumps of a road surface. To enable such floating motion of the rear wheels 51R, 51L, constant-velocity joints 55 are for example used respectively on axles 53R, 53L. The vehicle is so constituted that the axles 53R, 53L pivot and thus swing around the joints 55. As the final drive 11 is more compact in width, the length between the pivots can be made longer. This is beneficial in assuring greater capacity of swinging motion by the axles 53R, 53L.

Referring mainly to FIG. 2, the final drive 11 receives input torque through a shaft 21 rotatable about an axis C1 and differentially distributes the torque through a differential device 33 about an axis C2 not parallel with the axis C1.

The shaft 21 is, around its outer end, fixedly provided with a companion flange for example, thereby being capable of drivingly coupling with a propeller shaft 9. Or, instead of the companion flange, splines or any other suitable coupling means may be provided.

Torque transmission from the shaft 21 to the differential device 33 is made by a combination of a pinion gear 23 and a ring gear 31. To transmit the torque in a different direction, these gears are in general, but not limited to, spiral or hypoid gears. The pinion gear 23 may be formed in a unitary body with an inner end of the shaft 21. The ring gear 31 may be, by means of tightening, welding or any other means, combined with an outer periphery of the differential device 33. The differential device 33 receives the torque about the axis C2 via the pinion gear 23 and the ring gear 31 to rotate therearound. The differential device 33 may be a simple differential or a so-called limited slip differential (LSD).

The final drive 11 may have built-in electric devices for the purpose of action control, detection of conditions thereof or such, and an example of the devices is an actuator 41. The actuator 41 includes electrically driving mechanisms such as an electrically excitable solenoid and a plunger combined therewith, and may be combined with a clutch 43 to realize a so-called lock-up differential illustrated in FIG. 3 or a so-called free-running differential illustrated in FIG. 4. Or, in place of or in addition to the actuator, a detector may be provided for detecting rotation speeds or such. The present embodiment nevertheless enables a compact configuration.

Figure 3:
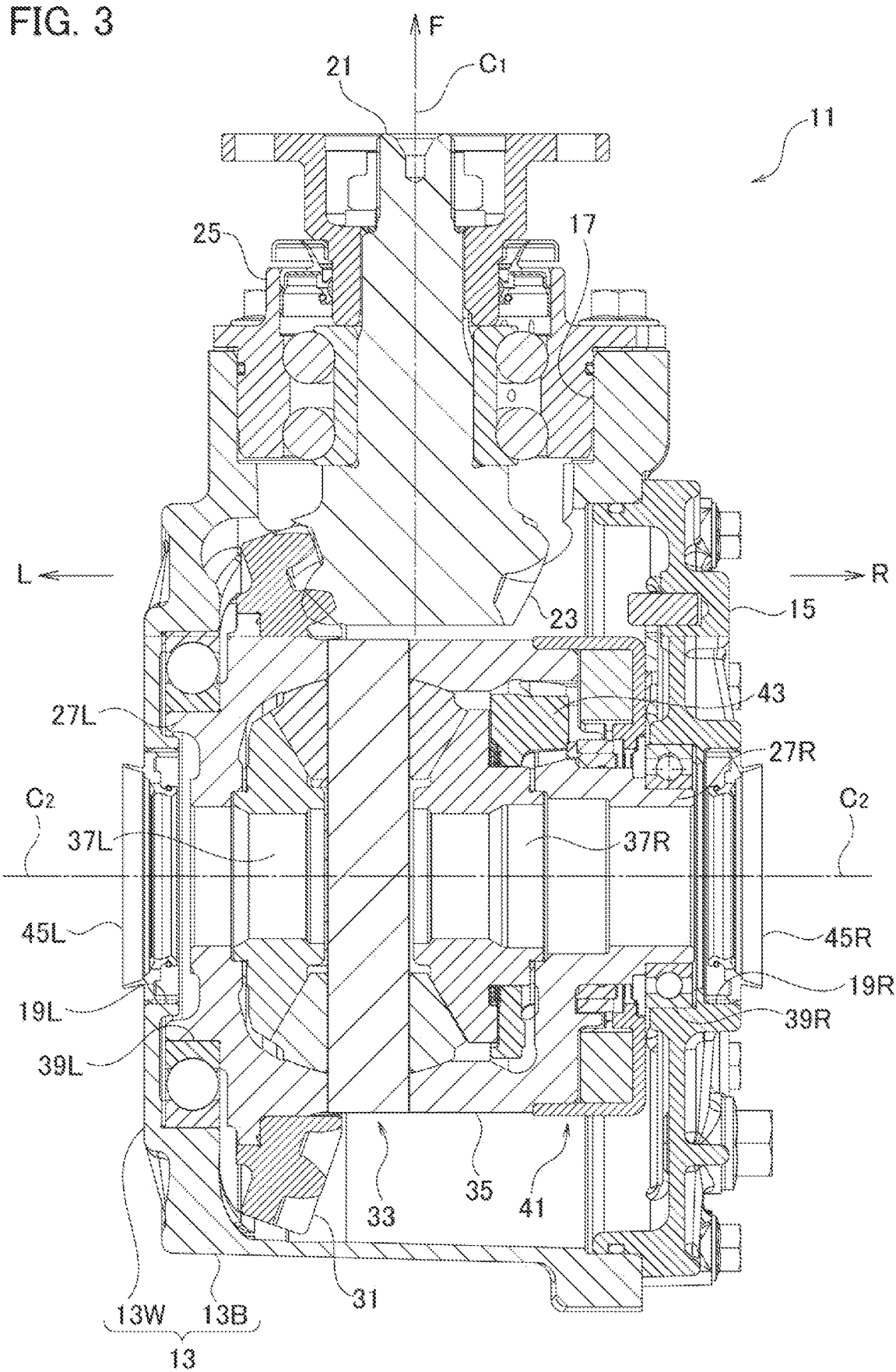
FIG. 3 is a longitudinal sectional view of the final drive.
Figure 4:
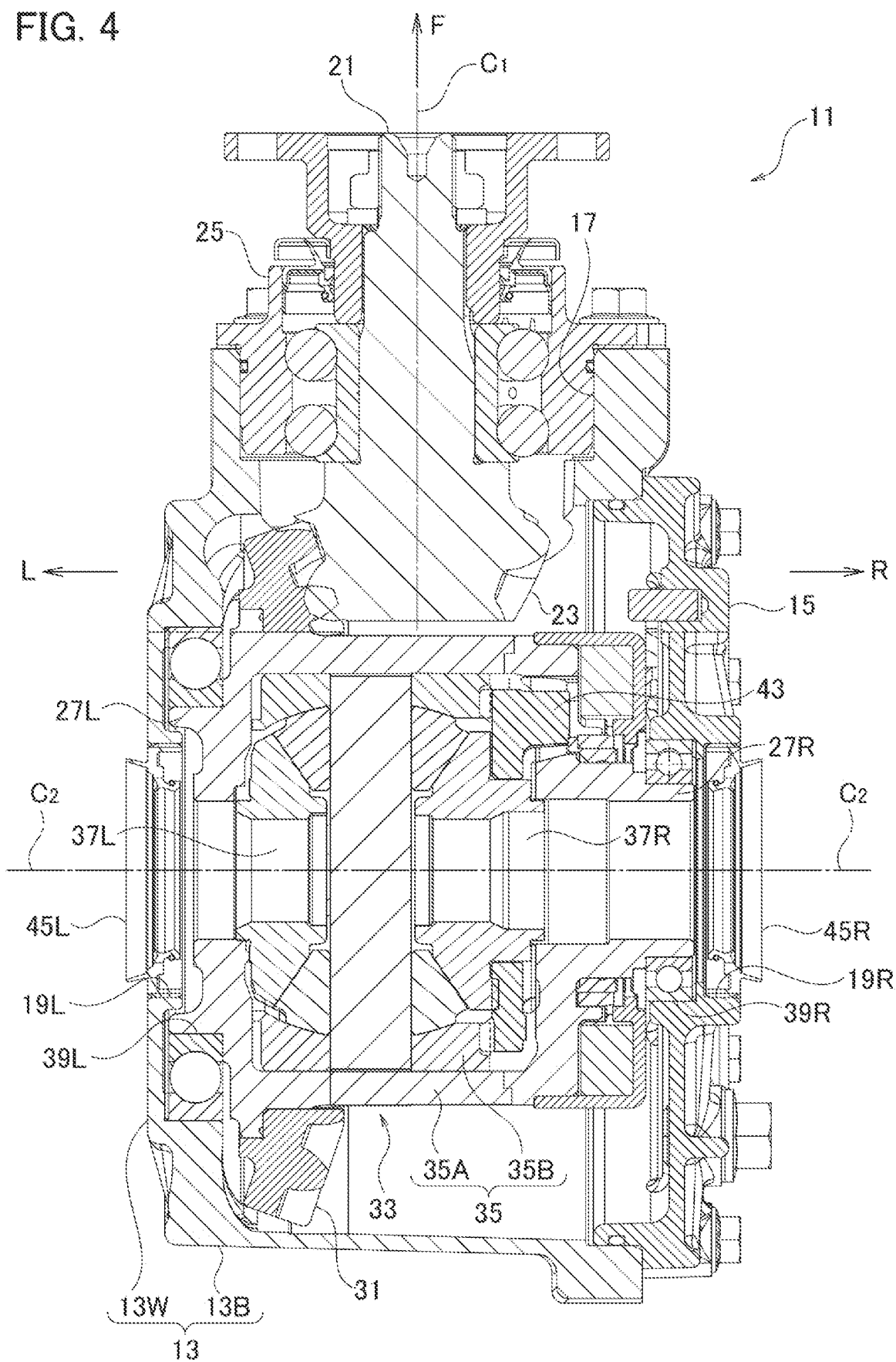
FIG. 4 is a longitudinal sectional view of a final drive according to another embodiment.

Referring to FIG. 3 or FIG. 4 in combination with FIG. 2, the differential device 33, the actuator 41 and other elements are housed in a combination of a housing 13 and a cover 15 joined thereto. The housing 13 and the cover 15 are separable and combinable not in a longitudinal direction (the direction along the axis C1) but in a lateral direction (the direction along the axis C2), and are, in other words, of a so-called side cover style. The housing 13 comprises a main portion 13B for surrounding the differential device 33 and the other elements, and a wall portion 13W as a unitary body with the main portion and covering its side. Although the wall portion 13W is indivisible from the main portion 13B, the cover 15 is divisible therefrom so as to cover the side opposite to the wall portion 13W. The wall portion 13W is provided with an opening 19L for receiving the left axle (or possibly the right axle, of course) and the cover 15 is provided with an opening 19R for receiving the right axle (or possibly the left axle), while the interior is separated from the exterior when both the axles are inserted.

The main portion 13B, the interior of which is a hollow chamber, may be formed in a shape similar to a cylinder generally symmetric about the axis C2 but is provided with a jacket portion projecting along the axis C1.

The jacket portion opens at its front end and is provided with a bore 17 passing through into the main portion 13B, and the bore 17 receives and supports the shaft 21. The bore 17 may be so formed at least in a size as to allow passage of the pinion gear 23, or may be so dimensioned as to support a bearing unit 25 for rotatably supporting the shaft 21.

Upon separating the cover 15 from the housing 13, the opening allowing access to the interior of the main portion 13B comes out and the differential device 33 can be introduced through this opening and thus installed in the interior. The opening has sufficient dimensions to allow passage of the ring gear 31, and the chamber in the interior is so dimensioned that the ring gear 31 introduced through the opening can move along the axis C2 to reach the proximity of the wall portion 13W.

The ring gear 31 comes very close to the wall portion 13W and the pinion gear 23 is in contrast disposed closer to the center of the final drive 11. The gears 23, 31 are in mesh with each other. The differential device 33 is provided with a casing 35 rotatable about the axis C2, with which the ring gear 31 is combined. The wall portion 13W, the ring gear 31, and the shaft 21 including the pinion gear 23 are, from the wall portion 13W toward the cover 15, or when viewed along the axis C2, arranged in an order of the wall portion 13W, the ring gear 31 and the shaft 21. Further, when viewed along the axis C2, the casing 35 and the pinion gear 23 may be so arranged as to overlap each other. This arrangement is beneficial in reducing the size of the final drive in the lateral direction.

The left end (or the right end) 27L of the casing 35 is supported by the wall portion 13W and the right end (or the left end) 27R thereof is supported by the cover 15. To allow rotation, ball bearings 39L, 39R may be respectively interposed, or roller bearings or any bearing elements may be interposed instead.

The differential device 33 is provided with side gears 37L, 37R to join with, and output torque to, axles. Each internal periphery thereof is provided with splines, or any other suitable joining means, in order to join with an axle. The side gears 37L, 37R are allowed to make mutually differential motions by means of the differential gear set. An example of the differential gear set is a bevel gear set illustrated in FIGS. 3 and 4, but any suitable gear set such as a face gear set, a planetary gear set or such, could be used.

To prevent leakage of fluid such as lubricant oil through peripheries of axles, the opening 19L, 19R may be provided with sealings 45L, 45R. The sealing 45L may be disposed radially inwardly as compared with the bearing 39L and they may overlap each other in the direction of the axis C2. This arrangement is beneficial in omitting a projecting structure around the opening 19L, which projects in the direction of the axis C2, and more specifically reducing the overall size in the lateral direction. The sealing 45R and the bearing 39R may be set in a similar positional relation although FIGS. 3 and 4 do not illustrate such.

The actuator 41 and the clutch 43 may be disposed close to or adjacent to the left end of the casing 35 (in the case of the arrangement of FIGS. 3 and 4). The actuator 41 slidably fits on the casing 35 for example and the clutch 43 is so disposed as to be driven thereby.

In the lock-up differential illustrated in FIG. 3, the casing 35 combined with the ring gear 31 steadily transmits the receiving torque to the differential gear set. When the clutch 43, driven by the actuator 41, engages with the right side gear 37R, the right side gear 37R loses the ability to rotate relative to the casing 35, and also the left side gear 37L mechanically regulated thereby via the gear set loses the ability to make differential motion. The clutch 43 may alternatively engage with any element other than the side gear.

In the free-running differential illustrated in FIG. 4, the casing 35 comprises an outer casing 35A fixedly combined with the ring gear 31 and an inner casing 35B temporarily combined therewith via the clutch 43. When the clutch 43 gets disengaged from the inner casing 35B, the inner casing 35 B is freed from the outer casing 35A and is thus capable of freely rotating so that the torque is not transmitted to both the axles. When the clutch 43 driven by the actuator 41 engages with the inner casing 35B, as the inner casing 35B rotates unitarily with the outer casing 35A, the torque is transmitted to the differential gear set therein and the differential device 33 differentially transmits the torque to both the axles.

In any case, as described already, because the ring gear 31 is closer to the wall portion 13W than the shaft 21 including the pinion gear 23 is, available room is left in the housing 13 around the cover 15 and therefore the actuator 41 and the clutch 43 can be disposed there. In turn, the cover 15 is not required to project sideways in order to secure a room for housing these elements and thus the housing 13 including the cover 15 as a whole can be laterally compact. Because the ring gear is largest in diameter among internal components, as is known, to design the housing 13 to allow placement of this element at the innermost therein might lead to an unfavorable expectation that considerable size reduction of the housing would be unachievable. Despite the general knowledge weighing against use of such an arrangement, the present embodiment realizes a laterally compact configuration. As described already, the laterally compact structure provides various advantages such as greater capacity of swinging motion of the axles 53R, 53L.

Further, in this arrangement, as electric devices are disposed closer to the cover 15, wiring thereto is readily installed. A manufacturer must work at the interior of the differential device 33 viewed from the opening on the housing 13 to install wiring if the electric devices are close to the wall portion 13W. It requires very difficult work and also inspection thereof becomes rather difficult. In the present embodiment in contrast, the electric devices come closer to the opening and are thus readily accessible when the housing 13 is opened. It is only required to connect cables led from the electric devices to a connector provided on the cover 15, and then wiring can be finished. Both assembly and inspection are very easily executable.

In the arrangement by the present embodiment, how to mesh the pinion gear 23 with the ring gear 31 is an issue. The reason is that, contrary to the prior art, it is impossible to first dispose the ring gear 23 and next mesh the ring gear 31 therewith. In the present embodiment, this issue can be resolved by first disposing the ring gear 31 and next inserting the shaft 21 through the opening in the jacket portion and installing it therein. To regulate the gear engagement, the shaft 21 may be provided with a regulation mechanism for gear engagement.

Although certain exemplary embodiments are described above, modifications and variations of the embodiments will occur to those skilled in the art, in light of the above teachings.

The invention claimed is:

1. A final drive for differentially distributing torque input into a shaft directed along a first axis via a differential device to a pair of axles directed along a second axis not parallel with the first axis, the final drive comprising:
 a ring gear coupled via gearing to the shaft to transmit the torque to the differential device about the second axis;
 a housing unitarily including a main portion supporting the shaft and enclosing the differential device, and a wall portion including a first opening through which a first one of the axles passes and supporting a first end of the differential device;
 a cover including a second opening through which a second one of the axles passes, and combined with the housing to support a second end of the differential device;
 a sealing secured to the first opening to prevent fluid leakage; and
 a bearing rotatably supporting the first end,
 wherein the wall portion, the ring gear, and the shaft are arranged, from the wall portion toward the cover, in an order of the wall portion, the ring gear, and the shaft, and
 wherein the sealing is disposed inside of the bearing and at least partially overlaps with the bearing in a radial direction of the second axis.

2. The final drive of claim 1, further comprising:
 a clutch configured to control operation of the differential device; and
 an actuator configured to drive the clutch, the actuator being housed in a combination of the housing and the cover, and disposed closer than the shaft to the cover.

3. The final drive of claim 1, wherein the cover is divisible in a direction along the second axis from the housing, and the wall portion is indivisible from the main portion.

4. The final drive of claim 1, wherein the shaft unitarily comprises a pinion gear in mesh with the ring gear, and the main portion comprises a bore opened to the first axis and dimensioned so as to allow passage of the pinion gear.

5. The final drive of claim 2, wherein the clutch is configured either to limit differential motion of the differential device or to drivingly couple the ring gear to a gear set of the differential device.

* * * * *